(12) United States Patent
Droste et al.

(10) Patent No.: US 12,016,071 B2
(45) Date of Patent: Jun. 18, 2024

(54) INTELLIGENT VEHICLE SYSTEMS AND CONTROL LOGIC FOR CELLULAR LINK MONITORING AND FAILURE DETECTION

(71) Applicant: GM GLOBAL TECHNOLOGY OPERATIONS LLC, Detroit, MI (US)

(72) Inventors: Scott T. Droste, West Bloomfield, MI (US); Reza Amini, Bloomfield, MI (US); David M. George, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 276 days.

(21) Appl. No.: 17/557,495

(22) Filed: Dec. 21, 2021

(65) Prior Publication Data
US 2023/0199888 A1    Jun. 22, 2023

(51) Int. Cl.
| H04W 76/00 | (2018.01) |
| H04W 4/44 | (2018.01) |
| H04W 24/04 | (2009.01) |
| H04W 60/04 | (2009.01) |
| H04W 76/19 | (2018.01) |

(52) U.S. Cl.
CPC ............ *H04W 76/19* (2018.02); *H04W 4/44* (2018.02); *H04W 24/04* (2013.01); *H04W 60/04* (2013.01)

(58) Field of Classification Search
None
See application file for complete search history.

(56) References Cited

U.S. PATENT DOCUMENTS

| 5,842,130 | A | 11/1998 | Oprescu-Surcobe et al. |
| 9,305,411 | B2 * | 4/2016 | Ricci ..................... G06F 3/0482 |
| 9,369,552 | B2 * | 6/2016 | Moeller ................ H04W 76/19 |
| 9,578,580 | B1 | 2/2017 | Ishfaq et al. |
| 9,705,992 | B2 | 7/2017 | Proste et al. |
| 9,738,125 | B1 * | 8/2017 | Brickley .................. B60D 1/62 |
| 10,833,796 | B2 * | 11/2020 | Lee ........................ H04L 1/0004 |
| 10,862,558 | B1 | 12/2020 | Aminikashani et al. |

(Continued)

FOREIGN PATENT DOCUMENTS

| EP | 3684084 A1 * | 7/2020 | .............. B60L 3/00 |
| WO | WO-2022047034 A1 * | 3/2022 | .......... H04B 17/309 |

*Primary Examiner* — Gerald A Smarth
(74) *Attorney, Agent, or Firm* — Quinn IP Law

(57) ABSTRACT

Presented are intelligent vehicle communications systems for cellular link monitoring and failure detection, methods for making/using such systems, and vehicles equipped with such systems. A method for operating a wireless-enabled vehicle component of a motor vehicle includes a cellular communications device of the vehicle component detecting an uplink (or downlink) network data packet transmitted by (or to) the vehicle. An electronic vehicle controller then establishes an observation period as a function of the time at which the network data packet was transmitted. The opposite downlink (or uplink) of the wireless-enabled vehicle component is monitored to determine if a downlink (or uplink) network data packet is received within the observation period, thereby indicating detection of a cellular link failure. Responsive to a detected cellular link failure, the vehicle controller conducts a supplemental assessment of the opposite link and/or a corrective action to re-establish a data link for the opposite link.

20 Claims, 2 Drawing Sheets

(56) References Cited

U.S. PATENT DOCUMENTS

| | | | |
|---|---|---|---|
| 2004/0198366 A1* | 10/2004 | Crocker | H04W 76/19 455/455 |
| 2015/0172919 A1 | 6/2015 | Basnayake et al. | |
| 2016/0021697 A1* | 1/2016 | Vargantwar | H04W 76/19 370/329 |
| 2016/0191375 A1* | 6/2016 | Gopala Krishnan | H04L 1/1877 370/217 |
| 2020/0281037 A1* | 9/2020 | Cui | H04W 76/15 |
| 2021/0122312 A1 | 4/2021 | AminiKashani et al. | |
| 2021/0153154 A1 | 5/2021 | Droste et al. | |
| 2022/0416870 A1* | 12/2022 | Ling | H04W 72/1268 |

\* cited by examiner

INTELLIGENT VEHICLE SYSTEMS AND CONTROL LOGIC FOR CELLULAR LINK MONITORING AND FAILURE DETECTION

INTRODUCTION

The present disclosure relates generally to cellular communications systems. More specifically, aspects of this disclosure relate to wireless-enabled motor vehicles with cellular link monitoring and detection failure capabilities.

Current production motor vehicles, such as the modern-day automobile, may be equipped with a network of onboard electronic control units and wireless communications devices that provide automated driving capabilities and navigation assistance. As vehicle processing, communication, and sensing capabilities improve, manufacturers persist in offering more automated driving capabilities with the aspiration of producing fully autonomous "self-driving" vehicles competent to navigate among heterogeneous vehicle types in both urban and rural scenarios. Original equipment manufacturers (OEM) are moving towards vehicle-to-vehicle (V2V) and vehicle-to-infrastructure (V2I) "talking" cars with higher-level driving automation that employ autonomous control systems to enable vehicle routing with steering, lane changing, scenario planning, etc. Automated path planning systems, for example, utilize vehicle state and dynamics sensors, geolocation information, map and road condition data, and path prediction algorithms to provide route derivation with automated lane center and lane change forecasting.

To provide occupants with telecommunications and informatics functionality, many vehicle passenger compartments are now furnished with a center-stack telematics unit that enables the sending, receiving, and storing of information using wireless connectivity. The telematics unit may wirelessly connect to a cellular network for such purposes as real-time navigation, customer support, vehicle tracking, system monitoring, traffic data, and fleet management. In general, the telematics unit functions as a bidirectional radio transceiver that is able to simultaneously transmit and receive data in the form of network data packets. Data packets may be transmitted via UHF radio signal from a cell tower to a cellular-enabled vehicle via downlink (or download) transmission and, conversely, may be transmitted via uplink (or upload) transmission from the vehicle to a cell tower. A disturbance in uplink or downlink signal in a cellular network may cause a weak or intermittent signal that leads to a disruption in telematics functionality.

SUMMARY

Presented herein are intelligent vehicle communications systems with attendant control logic for cellular link monitoring and failure detection, methods for making and methods for using such systems, and motor vehicles equipped with such systems. By way of example, there are presented cellular-enabled vehicles equipped with a telematics unit that provisions cellular link monitoring by evaluating uplink and downlink transmissions at the vehicle node to identify a link failure. Upon detection of a link failure, ameliorative actions may be taken to re-establish the failed cellular link. For instance, the telematics unit may automatically respond to a detected cellular link failure by power cycling the telematics unit, reattaching the cellular link, updating carrier settings, etc., in order to reconnect to established services and applications (e.g., ONSTAR® back office, internet application, etc.) without the need for user intervention.

Current techniques typically rely on a mobile device to "ping" a remote server to establish end-to-end connectivity. Disclosed techniques, in contrast, passively monitor data packets originated by the vehicle (uplink data) and data packets destined to the vehicle (downlink data) for established and on-going applications. For each given (uplink data) packet, for example, the opposite link (downlink data traffic) is examined over a predefined time interval prior to (uplink) packet transmission and extending for a predefined time interval after (uplink) packet transmission. If no packet is observed at the opposite link for the duration of this observation period, an error state counter is incremented. When the error state counter exceeds a calibrated threshold over a predetermined number (M) of successive packets, the system declares a link failure (downlink fault) and commences further link assessments and/or link recovery techniques.

Attendant benefits for at least some of the disclosed concepts include intelligent vehicle communications systems that accurately predict a cellular link failure without the need for active measures, such as "pinging" a remote server, and without needlessly incurring superfluous cellular data charges. Additional benefits may include the ability to independently monitor and evaluate each cellular-enabled vehicle component and IP address within the vehicle (e.g., telematics services may be monitored and corrective action taken independently of in-vehicle application traffic or WiFi hotspot services). In addition to accurate link failure detection, disclosed systems and methods may also help to reduce disruptions in telematics functionality caused by weak or intermittent cellular signals.

Aspects of this disclosure are directed to system control logic, closed-loop feedback control techniques, and computer-readable media (CRM) for operating and/or for manufacturing any of the disclosed vehicles, systems, and/or devices. In an example, a method is presented for controlling operation of a wireless-enabled vehicle component of a motor vehicle, such as an in-vehicle telematics unit, multimedia entertainment system, digital instrument cluster, V2X communications suite, internet access point, battery pack cell monitoring unit (CMU), and other enabled devices. This representative method includes, in any order and in any combination with any of the above and below disclosed options and features: detecting, e.g., via a cellular communications device of the wireless-enabled vehicle component, an uplink (or downlink) network data packet transmitted by (or to) the vehicle; determining, e.g., in real-time via a resident or remote electronic vehicle controller, an observation period as a function of a transmission time at which the uplink data packet was transmitted; monitoring, e.g., via the vehicle controller in cooperation with the cellular communications device, an opposite downlink (or uplink) port of the wireless-enabled vehicle component to determine if an opposite downlink (or uplink) network data packet is not received within the observation period, thereby indicating detection of a cellular link failure; and conducting, e.g., via the vehicle controller in response to the detected cellular link failure, a supplemental assessment of the downlink (or uplink) and/or a corrective action designed to re-establish a data link for the downlink (or uplink).

Also presented are non-transitory CRM storing instructions that are executable by one or more processors of one or more resident/remote vehicle controllers of a motor vehicle. The vehicle also includes one or more wireless-enabled vehicle components that is/are attached to the vehicle. These instructions, when executed by at least one of the processors, cause at least one of the controllers to perform operations including: receiving, from a cellular communications device of a wireless-enabled vehicle component, a signal indicating detection of a network data packet transmitted to or from the wireless-enabled vehicle component of the motor vehicle; determining an observation period as a function of a transmission time at which the network data packet was transmitted; monitoring an opposite link of the wireless-enabled vehicle component to determine if an opposite network data packet is not received within the observation period thereby indicating detection of a cellular link failure; and conducting a supplemental assessment of the opposite link and/or a corrective action predetermined to re-establish a data link for the opposite link in response to the detection of the cellular link failure.

Additional aspects of this disclosure are directed to intelligent vehicle communications systems that provision cellular link monitoring and failure detection. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, a motor vehicle includes a vehicle body with multiple road wheels, a passenger compartment, and other standard original equipment. A prime mover, such as an electric traction motor and/or an internal combustion engine assembly, drives one or more of the road wheels to thereby propel the vehicle. Also mounted to the vehicle is a wireless-enabled vehicle component that employs a cellular communications device for exchanging data across a cellular network.

Continuing with the discussion of the above example, one or more resident or remote electronic vehicle controllers connect with the vehicle component's cellular communications device to receive one or more signals indicating detection of an uplink/downlink network data packet that was transmitted by or to the wireless-enabled vehicle component. The vehicle controller(s) then calculate an observation period based on the transmission time at which the uplink/downlink data packet was transmitted. An opposite downlink/uplink of the wireless-enabled vehicle component is monitored to determine if an opposite downlink/uplink network data packet is not received within the observation period, which indicates that a cellular link failure has occurred. Responsive to detection of a cellular link failure, the vehicle controller(s) conduct a supplemental assessment of the opposite link and/or a corrective action predetermined to re-establish a data link for the opposite link.

For any of the disclosed vehicles, systems, and methods, determining the observation period may include defining a front-end time interval preceding the transmission time of the network data packet and a back-end time interval following the transmission time. For instance, a start time for the front-end time interval may be calculated as $[t(n)-t_b]$, and an end time for the back-end time interval may be calculated as $[t(n)+t_a]$. In this example, $t(n)$ is the uplink (or downlink) data packet's transmission time, n is a link packet counter number associated with the uplink (or downlink) network data packet under observation, $t_a$ is a first time constant, and $t_b$ is a second time constant, which may be the same as or distinct from the first time constant.

For any of the disclosed vehicles, systems, and methods, an error detection counter is responsively incremented each time an opposite downlink (or uplink) data packet is not received at the opposite link within the observation period for a corresponding uplink (or downlink) data packet. Upon detection of a link error, the vehicle controller determines if the error detection counter exceeds a system-calibrated "detected error" threshold (e.g., five detected errors within 25 uplink transmissions). In this instance, detection of a cellular link failure is declared when the error detection counter exceeds the predefined detected error threshold. If the error detection counter does not exceed the detected error threshold, the system responsively continues to monitor the vehicle component's cellular communications device for transmission of another uplink (or downlink) data packet. As a further option, if the opposite downlink (or uplink) data packet is received at the downlink (or uplink) within the observation period, the system may responsively determine if: (1) a system-calibrated threshold number of uplink (or downlink) data packets (e.g., 25) has been transmitted by (or to) the vehicle, and (2) the error detection counter is less than the detected error threshold. Responsive to the calibrated number of network data packets having been transmitted concurrent with the error detection counter being less than the detected error threshold, the error detection counter may be reset to zero.

For any of the disclosed vehicles, systems, and methods, the vehicle controller may receive a link trigger that causes the wireless-enabled vehicle component to connect with a cellular network, such as a "Key On" event of the vehicle or a "Power On" event of the telematics unit. In this instance, monitoring and detection of uplink and downlink network data packets may be responsive to receipt of a link trigger. Upon receipt of a link trigger, a link packet counter may be reset, e.g., to zero or one. Each time an opposite downlink (or uplink) data packet is received within the observation period associated with a received uplink (or downlink) data packet, the link packet counter is responsively incremented by one. After incrementing the link packet counter, the system returns to monitoring the wireless-enabled vehicle component for transmission of another network data packet. After receiving a link trigger, the system responsively determines if any network data packets are transmitted to or from the wireless-enabled vehicle component of the motor vehicle. If no network data packets are transmitted, the system continues to monitor the cellular communications device of the wireless-enabled vehicle component for transmission of a new uplink/downlink network data packet.

For any of the disclosed vehicles, systems, and methods, the corrective action may include deactivating and subsequently reactivating a cellular data link associated with an access point name (APN) of the wireless-enabled vehicle component. As a further option, the corrective action may include performing a cellular network detach (i.e., a device-triggered detach protocol) followed by a network registration (i.e., a device-instigated attach protocol) with the cellular network that is serving the wireless-enabled vehicle component. As yet a further option, the supplemental assessment may include evaluating the signal strength and/or the signal quality at the failed downlink (or uplink) port of the wireless-enabled vehicle component.

For any of the disclosed vehicles, systems, and methods, the wireless-enabled vehicle component may include an in-vehicle telematics unit with an electronic display device that is mounted within a passenger compartment of the motor vehicle. In this instance, the vehicle controller may respond to detection of a cellular link failure by commanding the telematics unit's the display device to display a notification of the cellular link failure to a vehicle occupant. As another option, the vehicle controller may transmit a notification of the cellular link failure to an off-board host service or other third-party entity that may track and/or service such cellular link failures.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
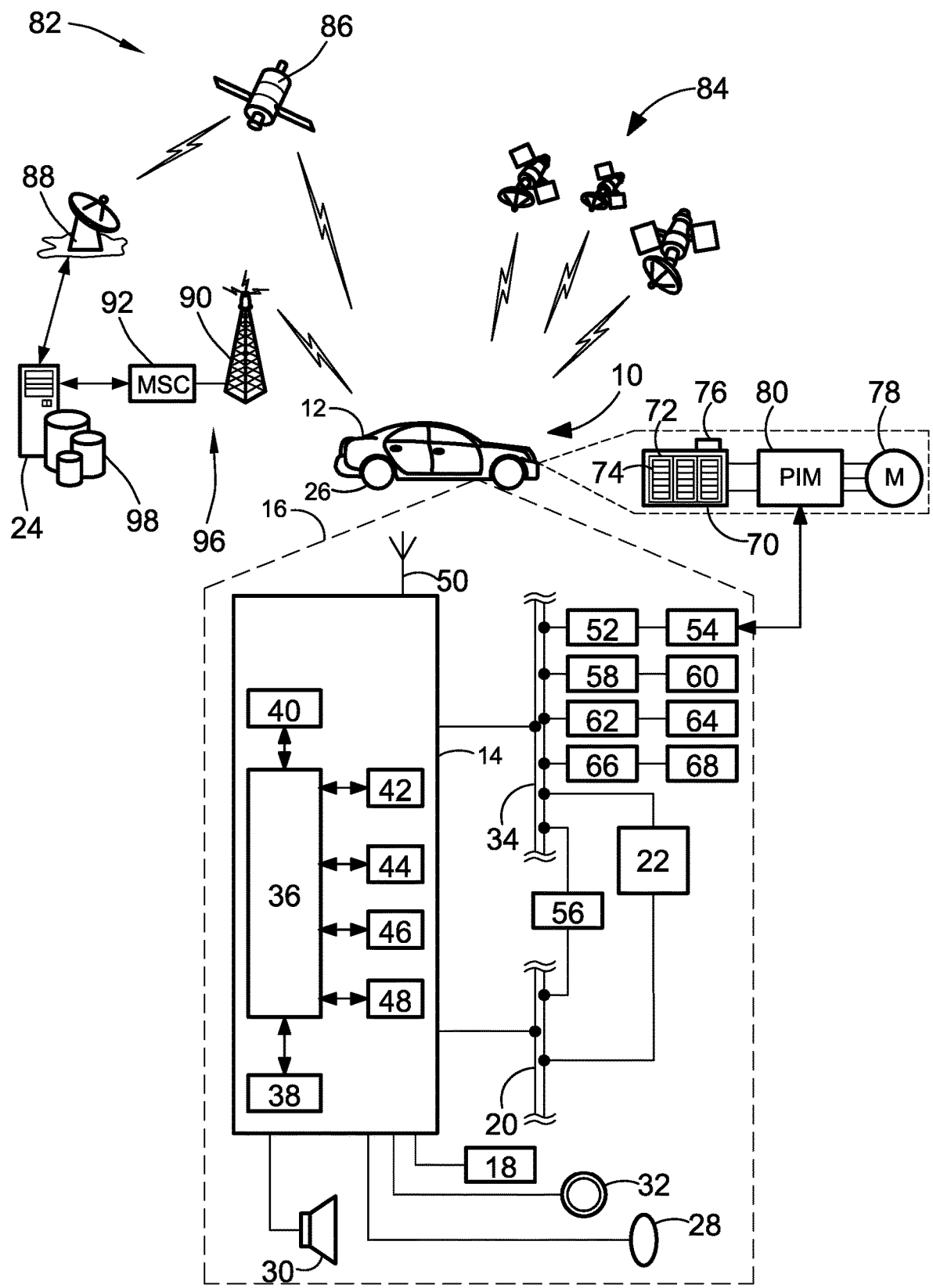
FIG. 1 is a partially schematic, side-view illustration of a representative motor vehicle with a network of in-vehicle controllers, sensing devices, and communication devices for passive cellular link monitoring and failure detection in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative automobile, which is designated generally at 10 and portrayed herein for purposes of discussion as a sedan-style, electric-drive passenger vehicle. The illustrated automobile 10—also referred to herein as "motor vehicle" or "vehicle" for short—is merely an exemplary application with which novel aspects of this disclosure may be practiced. In the same vein, incorporation of the present concepts into an all-electric vehicle powertrain should also be appreciated as a non-limiting implementation of disclosed features. As such, it will be understood that aspects and features of this disclosure may be applied to other powertrain configurations, may be implemented for any logically relevant type of vehicle, and may be provisioned by other communications system architectures. Moreover, only select components of the motor vehicle and communications system are shown and described in additional detail herein. Nevertheless, the vehicles and systems discussed below may include numerous additional and alternative features, and other available peripheral components, for carrying out the various methods and functions of this disclosure.

The representative vehicle 10 of FIG. 1 is originally equipped with a vehicle telecommunication and information ("telematics") unit 14 that wirelessly communicates, e.g., via cell towers, base stations, mobile switching centers, satellite service, etc., with a remotely located computing host service 24 (e.g., ONSTAR®). Some of the other vehicle hardware components 16 shown in FIG. 1 include, as non-limiting examples, an electronic video display device 18, a microphone 28, audio speakers 30, and assorted user input controls 32 (e.g., buttons, knobs, pedals, switches, touchpads, joysticks, touchscreens, etc.). These hardware components 16 function, in part, as a human/machine interface (HMI) to enable a user to communicate with the telematics unit 14 and other components within the vehicle 10. Microphone 28 provides a vehicle occupant with means to input audible commands; the vehicle 10 may be equipped with an embedded voice-processing unit utilizing audio filtering, editing, and analysis modules. Conversely, speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, media-oriented system transfer (MOST) interfaces, local interconnection network (LIN) interfaces, and the like. Other appropriate communication interfaces may include those that conform with ISO, SAE, and/or IEEE standards and specifications. The network connection interface 34 enables the vehicle hardware 16 to send and receive signals with one another and with various systems and subsystems both within or "resident" to the vehicle body 12 and outside or "remote" from the vehicle body 12. This allows the vehicle 10 to perform assorted vehicle functions, such as modulating powertrain output, governing power transmission operation, selectively engaging the brake system, controlling vehicle steering, regulating charge/discharge of the vehicle's battery pack, and other automated driving functions. For instance, telematics unit 14 receives and transmits signals and data to/from a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, flash memory, semiconductor memory (e.g., various types of RAM or ROM), etc.

Long-range vehicle communication capabilities with remote networked devices may be provided via one or more or all of a cellular chipset/component, a navigation and location chipset/component (e.g., global positioning system (GPS) transceiver), and/or a wireless modem, all of which are collectively represented at 44. Close-range wireless connectivity may be provided via a short-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components or, optionally, may include additional components and functionality as desired for a particular end use. The various communications devices described above may be operable to exchange data as part of a periodic broadcast in a vehicle-to-vehicle (V2V) communications system or a vehicle-to-everything (V2X) communications system, e.g., Vehicle-to-Infrastructure (V2I), Vehicle-to-Pedestrian (V2P), Vehicle-to-Device (V2D), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, for executing an automated driving operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. Using data from these sensing devices 62, 64, 66, 68 allows the CPU 36 to identify surrounding driving conditions, determine roadway characteristics and surface conditions, identify target objects within a detectable range of the vehicle, determine attributes of a target object, such as size, relative position, orientation, distance, angle of approach, relative speed, etc., and execute automated control maneuvers based on these executed operations.

To propel the electric-drive vehicle 10, an electrified powertrain is operable to generate and deliver tractive torque to one or more of the vehicle's road wheels 26. The powertrain is generally represented in FIG. 1 by a rechargeable energy storage system (RESS), which may be in the nature of a chassis-mounted traction battery pack 70, that is operatively connected to an electric traction motor 78. The traction battery pack 70 is generally composed of one or more battery modules 72 each having a stack of battery cells 74, such as lithium ion, lithium polymer, or nickel metal hydride battery cells of the pouch, can, or prismatic type. One or more electric machines, such as traction motor/generator (M) units 78, draw electrical power from and, optionally, deliver electrical power to the RESS's battery pack 70. A dedicated power inverter module (PIM) 80 electrically connects the battery pack 70 to the motor/generator (M) unit(s) 78 and modulates that transmission of electrical current therebetween. Disclosed concepts are similarly applicable to HEV and ICE-based powertrain architectures.

The battery pack 70 may be configured such that module management, cell sensing, and module-to-module or module-to-host communication functionality is integrated directly into each battery module 72 and performed wirelessly via a wireless-enabled cell monitoring unit (CMU) 76. The CMU 76 may be a microcontroller-based, printed circuit board (PCB)-mounted sensor array. Each CMU 76 may have a GPS transceiver and RF capabilities and may be packaged on or in a battery module housing. The battery module cells 74, CMU 76, housing, coolant lines, busbars, etc., collectively define the cell module assembly.

Also shown in FIG. 1 is a mobile vehicle communications (MVC) system 82 that enables wireless communications with remotely located computing nodes for one or more travelling and stationary vehicles 10. MVC system 82 is represented herein by a constellation of GPS satellites 84, a wireless services satellite 86, an uplink transmitting station 88, a cellular (cell) transceiver tower 90, and a switching center (MSC) 92. A GPS transceiver 44 may exchange radio signals (e.g., 1.58 GHz (L1 signal) or 1.23 GHz (L2 signal)) with the constellation of GPS satellites 84 to derive real-time or near real-time geopositional data and time information for the vehicle 10, which may be used, for example, to provide navigation and other related services to vehicle occupants. Wireless services satellite 86, through cooperative operation with the uplink transmitting station 88, provisions unidirectional or bidirectional communications with the vehicle 10, such as satellite radio and media services (e.g., music, news, videos, etc.) and satellite telephony services (e.g., utilized in addition to or in lieu of cellular phone services). While shown with a single vehicle 10 communicating with multiple GPS satellites 84, a single wireless services satellite 86, a single uplink station 88, a single cell tower 90, and a single MSC 92, MVC system 82 may incorporate any number and combination of the foregoing elements as well as other available and hereafter developed communications hardware.

The mobile vehicle communications system 82 may also operate within a cellular communications system 96, which is represented in FIG. 1 by one or more cell towers 90, one or more mobile switching centers 72, as well as any other networking components needed to connect the cellular communications system 96 with a land network (e.g., host service 24). Each cell tower 90 may be equipped with a respective set of sending and receiving antennas for exchanging radio signals (e.g., 1.8-2.1+ GHz frequencies), as well as a dedicated base station. The base stations of different cell towers may be connected to the MSC 72 either directly or via intermediary equipment, such as a base station controller (not shown). The cellular communications system 96 may implement any suitable communications technology, including earlier cellular protocols, such as cellular digital packet data (CDPD) 2G technologies, or modern cellular protocols, such as 4G-LTE of 5G-Advanced technologies. Vehicle telematics unit 14 may function as a cellular-enabled mobile component that is registered with a cellular carrier to transmit network data packets to and from the cellular communications system 96. It should be appreciated that the system 96 may take on innumerable tower/station/MSC arrangements, including co-location of a base station and a cell tower at the same site, remotely locating base stations and cell towers from one another, a single base station servicing a single cell tower, a single cell servicing multiple cell towers, and coupling multiple base stations to a single MSC, to name but a few possible arrangements.

Figure 2:
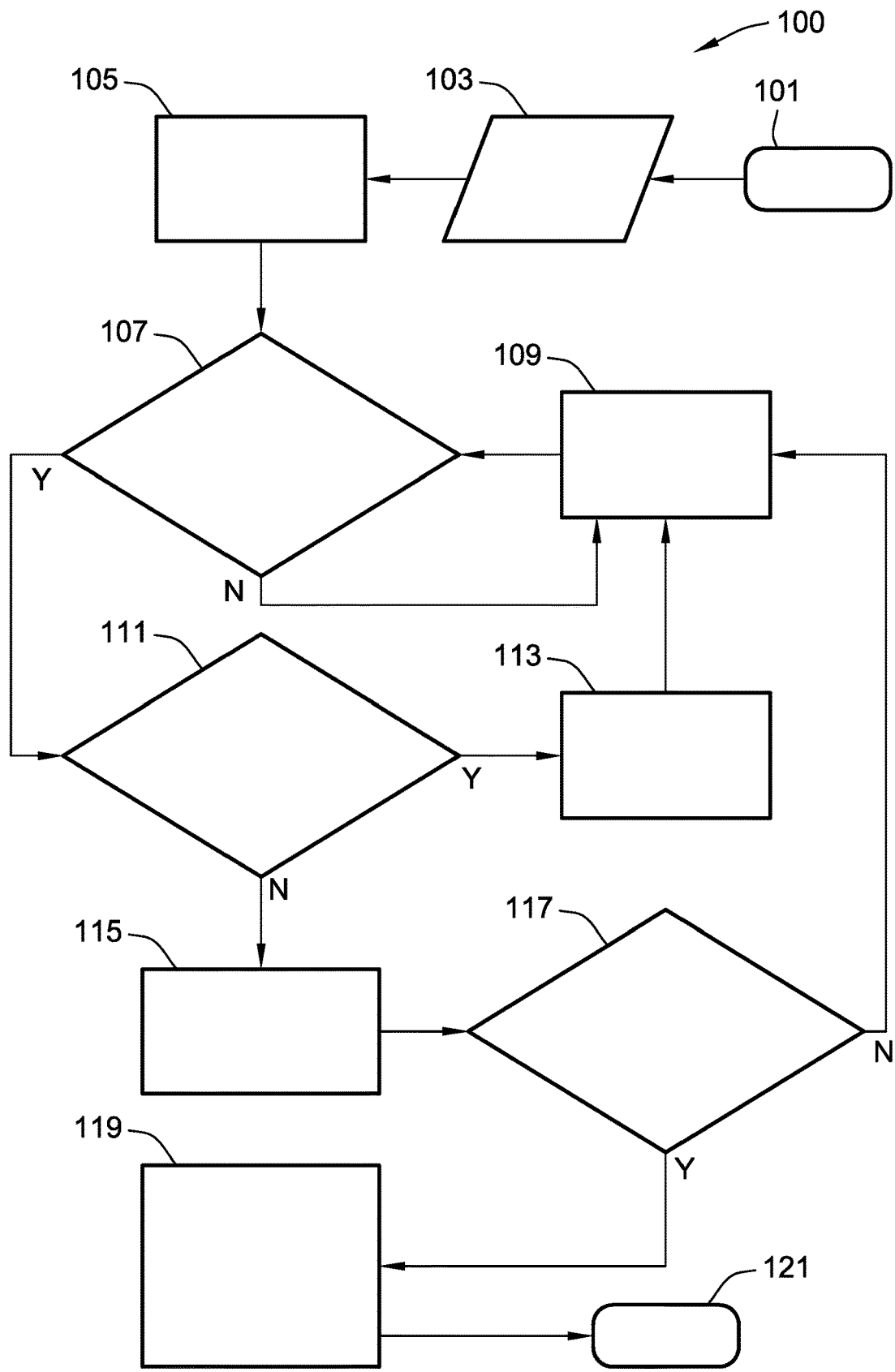
FIG. 2 is a flowchart illustrating a representative cellular data link monitoring algorithm for link failure detection in motor vehicles, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 2, an improved method or control strategy for cellular link monitoring and failure detection for a host vehicle, such as vehicle 10 of FIG. 1, that is wirelessly connected to a mobile network, such as cellular communications system 96, is generally described at 100 in accordance with aspects of the present disclosure. Some or all of the operations illustrated in FIG. 2, and described in further detail below, may be representative of algorithms that correspond to processor-executable instructions that are stored, for example, in main or auxiliary or remote memory (e.g., memory device 38 and/or database 98 of FIG. 1), and executed, for example, by an electronic controller, processing unit, logic circuit, or other module or device or network of modules/devices (e.g., CPU 36 and/or host computing service 24), to perform any or all of the above and below described functions associated with the disclosed concepts. It should be recognized that the order of execution of the illustrated operation blocks may be changed, additional operation blocks may be added, and some of the described operations may be modified, combined, or eliminated.

Method 100 begins at START terminal block 101 with memory-stored, processor-executable instructions for a programmable controller or control module or similarly suitable processor to call up an initialization procedure for a cellular link inspection protocol. This routine may be executed in real-time, near real-time, continuously, systematically, sporadically, and/or at regular intervals, for example, each 10 or 100 milliseconds during normal and ongoing operation of the motor vehicle 10. As yet another option, terminal block 101 may initialize responsive to a user command prompt, a resident vehicle controller prompt, or a broadcast prompt signal received from an "off-board" centralized vehicle services system (e.g., host computing service 24). For instance, method 100 may automatically initialize responsive to an electronic system controller receiving a comm link trigger, such as the vehicle CPU 36 receiving notification of a vehicle Ignition On prompt, the vehicle telematics unit 14 entering a Power On state, activation of a cellular data connection, activation of a cellular-dependent application or service, etc. Activation of a cellular data connection may include the telematics unit 14, after power on or reset, performing a cellular attach (3G or 4G) or registration process (5G) with a serving cellular network and successful activation of a Packet Data Network connection (3G or 4G) or Protocol Data Unit (PDU) Session Establishment (5G) for a data connection to an external network, such as the Internet or an access-restricted private data network. Upon completion of the control operations presented in FIG. 2, the method 100 may advance to END terminal blocks 121 and temporarily terminate or, optionally, may loop back to terminal block 101 and run in a continuous loop.

Following link monitoring initialization, method 100 advances from terminal block 101 to LINK MONITORING data input/output block 103 to begin monitoring a wireless-enabled vehicle component of a host vehicle for output of an uplink network data packet or input of a downlink network data packet. With reference again to the representative application of FIG. 1, cellular chipset/component 44, acting as a cellular communications device, monitors the telematics unit 14 or other wireless-enabled in-vehicle component to sense when a network data packet is transmitted to or from the vehicle 10. Method 100 is described below as detecting cellular link errors and declaring link failures by monitoring a downlink port for receipt of a downlink packet contemporaneous with vehicle delivery of an uplink packet; nevertheless, link failure detection may also be performed by monitoring an uplink port for output of an uplink packet contemporaneous with vehicle receipt of a downlink packet.

Upon commencement of link monitoring at block 103, a link packet counter is reset at COUNTER RESET process block 105. In accord with the illustrated example, CPU 36 may run an uplink packet counter that acts as a construct to describe sequential, packet-by-packet inspection. Initially, the uplink packet counter may be set to zero; thereafter, the uplink packet counter may be incremented sequentially each time an uplink packet is output from the host vehicle. The uplink packet counter may also be reset responsive to a power-cycling of the wireless-enabled vehicle component or a detach/attach operation of the component's cell link.

After resetting the link packet counter, method 100 executes LINK TRANSMISSION decision block 107 to determine whether or not a network data packet is transmitted to or from the host vehicle. As shown, the CPU 36 of FIG. 1 receives data from cellular chipset/component 44 each time: (1) an uplink data packet is generated by an output from the telematics unit 14 to cell tower 90; and (2) a downlink data packet is received by the telematics unit 14 from the cell tower 90. For at least some implementations, uplink packets are transmitted by the telematics unit 14 on a Physical Uplink Shared Channel (PUSCH), whereas downlink packets are received by the telematics unit 14 on a Physical Downlink Shared Channel (PDSCH). If an uplink data packet is not sent at time $t(n)$ (block 107=NO), method 100 loops through LINK DETECTION process block 109 and waits for a new uplink data packet to be transmitted by the host vehicle.

Upon transmission of an uplink data packet at time $t(n)$ (block 107=YES), method 100 responsively advances to LINK RECEIPT decision block 111 to determine whether or not an "opposite" downlink data packet is received on the "opposite" downlink channel of the wireless-enabled vehicle component within a predefined observation period. When performing decision block 111, a resident or remote system controller may actively determine, in real-time, an observation period or "time window" as a function of the transmission time $t(n)$ at which the detected uplink data packet n was transmitted by the host vehicle. This observation period may be defined by both a front-end time interval that precedes the transmission time $t(n)$ of the uplink data packet n and a back-end time interval that follows the transmission time $t(n)$. A start time $t_s$ for the front-end time interval may be calculated as $[t(n)-t_b]$ such that the front-end time interval is defined as $[t_s \rightarrow t(n)]$, whereas an end time $t_e$ for the back-end time interval may be calculated as $[t(n)+t_a]$ such that the back-end time interval is defined as $[t(n) \to t_e]$ and the observation period is defined as $[t(n)-t_b, t(n)+t_a]$. In this example, $t_a$ is a back-end (first) time constant, and $t_b$ is a front-end (second) time constant, which may be the same as or distinct from the first time constant $t_a$.

If at least one downlink data packet is received by the process resident in the vehicle within this observation period (block 111=YES), thus suggesting that a link error is not present, method 100 executes COUNTER INCREMENTER process block 113 and increments the link packet counter (n=n+1). From there, method 100 loops back through LINK DETECTION process block 109 and the process resumes by waiting for the next transmission of an uplink data packet to continue the error condition detection process. If no downlink data packet is received by the process resident in the vehicle during the observation time window (block 111=NO), thus suggesting that a link error is present, the process marks this as an error condition and concomitantly increments an error detection counter at ERROR STATE COUNTER process block 115 (Error_state(t(n))=1). A timestamped error detection flag may also be set in memory to mark each occurrence of an error condition, e.g., for future reference during system remediation.

With continuing reference to FIG. 2, method 100 executes ERROR THRESHOLD decision block 117 to determine if the number of detected error conditions exceeds a system-calibrated "detected error" threshold value. In accord with the illustrated example, the in-vehicle process ascertains whether or not "Sum([error_state(t(n−error_window), t(n)]) >error_threshold?"; in other words, does the mathematical sum of all detected link error conditions (error_state) during a predefined time window preceding the transmission of the uplink data packet ([t(n)−error_window, t(n)]) exceed a predetermined error count threshold (e.g., error_threshold). As an example, the logic may declare a link failure if the monitored vehicle component encounters five (5) or more error conditions within a 15-second window of time. As an alternative option to a temporal evaluation window, the logic may employ a correlative evaluation window that declares a link failure if the monitored vehicle component encounters five or more error conditions over the course of 25 uplink data packets output by the vehicle component. If the total number of errors detected during the error detection window does not exceed the predetermined threshold (block 117=NO), method 100 loops back through LINK DETECTION process block 109 and then LINK TRANSMISSION decision block 107.

Responsive to ERROR THRESHOLD decision block 117 outputting a positive link failure declaration (block 117=YES), method 100 may automate one or more ameliorative actions at LINK FAILURE process block 119, e.g., to assess the reasons for the link failure or to attempt to rectify the link failure. For instance, if a link failure is declared, CPU 36 of vehicle 10 may conduct a supplemental link assessment of the failed downlink port of telematics unit 14 and/or may take corrective actions to reestablish the cellular link for the downlink port. A supplemental link assessment action may include evaluating a link signal strength and/or a link signal quality for the downlink port. By way of comparison, a failed link corrective action to re-establish the data link could include: (1) deactivation and reactivation of the cellular data link associated with the APN (e.g., 3GPP wireless specification term—Access Point Name) or DNN (e.g., 3GPP wireless specification term—Data Network Name) upon which the data connection had experienced a failure; and/or (2) perform a cellular detach or deregistration with the serving cellular network followed by a cellular attach or registration process with the serving cellular network along with a reactivation of the APN or DNN associated with the cellular data link experiencing the failure. As a further option, CPU 36 may direct the display device 18 of telematics unit 14 to display a notification of the cellular link failure to the occupant(s) of the vehicle 10.

Upon completion of the secondary assessments and corrective actions at LINK FAILURE process block 119, the error detection counter may be reset to zero. As yet a further option, the error detection counter may be reset as a result of a modem reset, a power cycling of the telematics module, or at ignition on/off. Notwithstanding these options, the error detection counter need not be reset because, as described above with respect to decision block 117, the algorithm inspects the increase of the error detection counter over an observation window and determines if that increase is greater than a threshold. More specifically, block 117 is looking at a change in the error detection counter—not looking at its absolute value.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for controlling operation of a wireless-enabled vehicle component of a motor vehicle, the method comprising:
    detecting, via a cellular communications device of the wireless-enabled vehicle component, a first network data packet transmitted to or from a first link port of the wireless-enabled vehicle component of the motor vehicle, wherein the first network data packet is either an uplink packet or a downlink packet, and wherein the first link port is either an uplink port or a downlink port;
    determining, via an electronic vehicle controller, an observation period as a function of a transmission time at which the first network data packet was transmitted;
    monitoring a second link port, opposite the first link port, of the wireless-enabled vehicle component to determine whether or not a second network data packet, opposite the first network data packet, is not received within the observation period thereby indicating detection of a cellular link failure; and
    conducting, via the electronic vehicle controller in response to the detection of the cellular link failure, a supplemental assessment of the second link port and/or a corrective action predetermined to re-establish a data link for the second link port.

2. The method of claim 1, wherein determining the observation period includes defining a front-end time interval preceding the transmission time of the first network data packet and a back-end time interval following the transmission time.

3. The method of claim 2, wherein the back-end time interval is defined as $[t(n) \rightarrow t(n)+t_a]$ and the front-end time interval is defined as $[t(n)-t_b \rightarrow t(n)]$, where $t(n)$ is the transmission time, n is a link packet counter number associated with the first network data packet, $t_a$ is a first time constant, and $t_b$ is a second time constant distinct from the first time constant.

4. The method of claim 1, further comprising:
    incrementing an error detection counter responsive to determining the second network data packet is not received at the second link port within the observation period; and
    determining if the error detection counter exceeds a detected error threshold,
    wherein the detection of the cellular link failure includes the error detection counter exceeding the detected error threshold.

5. The method of claim 4, further comprising monitoring the cellular communications device of the wireless-enabled vehicle component for transmission of another network data packet responsive to the error detection counter not exceeding the detected error threshold.

6. The method of claim 4, further comprising:
    determining, responsive to the second network data packet being received at the second link port within the observation period, if both: (1) a calibrated threshold number of network data packets has been transmitted to or from the motor vehicle, and (2) the error detection counter is less than the detected error threshold; and
    resetting the error detection counter to zero responsive to the calibrated threshold number of network data packets having been transmitted concurrent with the error detection counter being less than the detected error threshold.

7. The method of claim 1, further comprising receiving, via the electronic vehicle controller, a link trigger causing the wireless-enabled vehicle component to connect with a cellular network, wherein detecting the first network data packet is responsive to receiving the link trigger.

8. The method of claim 7, further comprising:
    resetting a link packet counter to zero responsive to receiving the link trigger;
    incrementing the link packet counter responsive to determining the second network data packet is received at the second link port within the observation period; and
    monitoring, subsequent to incrementing the link packet counter, the cellular communications device of the wireless-enabled vehicle component for transmission of another network data packet.

9. The method of claim 7, further comprising:
    determining if no network data packets are transmitted to or from the wireless-enabled vehicle component of the motor vehicle responsive to receiving the link trigger; and
    monitoring, responsive to determining no network data packets are transmitted, the cellular communications device of the wireless-enabled vehicle component for transmission of a new network data packet.

10. The method of claim 1, wherein the corrective action includes:
    deactivating and subsequently reactivating a cellular data link associated with an access point name (APN) of the wireless-enabled vehicle component; and/or
    performing a cellular network detach followed by a cellular network registration with a cellular network serving the wireless-enabled vehicle component.

11. The method of claim 1, wherein the supplemental assessment includes evaluating a signal strength and/or a signal quality of the second link port of the wireless-enabled vehicle component.

12. The method of claim 1, wherein the wireless-enabled vehicle component includes an in-vehicle telematics unit with an electronic display device mounted within a passenger compartment of the motor vehicle, the method further comprising transmitting, in response to the detection of the cellular link failure, a command signal to the telematics unit to display, via the display device, a notification of the cellular link failure.

13. A non-transitory, computer-readable medium storing instructions executable by a vehicle controller of a motor vehicle, the motor vehicle including a wireless-enabled vehicle component attached to the motor vehicle, the instructions, when executed, causing the vehicle controller to perform operations comprising:
    receiving, from a cellular communications device of the wireless-enabled vehicle component, a signal indicating detection of a first network data packet transmitted to or from a first link port of the wireless-enabled vehicle component of the motor vehicle, wherein the first network data packet is either an uplink packet or a downlink packet, and wherein the first link port is either an uplink port or a downlink port;

determining an observation period as a function of a transmission time at which the first network data packet was transmitted;

monitoring a second link port, opposite the first link port, of the wireless-enabled vehicle component to determine whether or not a second network data packet, opposite the first network data packet, is not received within the observation period thereby indicating detection of a cellular link failure; and conducting a supplemental assessment of the second link port and/or a corrective action predetermined to re-establish a data link for the second link port in response to the detection of the cellular link failure.

14. A motor vehicle, comprising:
a vehicle body;
multiple drive wheels mounted to the vehicle body;
a prime mover mounted to the vehicle body and operable to drive one or more of the drive wheels to thereby propel the motor vehicle;
a wireless-enabled vehicle component mounted to the vehicle body; and
an electronic vehicle controller programmed to:
receive, from a cellular communications device of the wireless-enabled vehicle component, a signal indicating detection of a first network data packet transmitted to or from a first link port of the wireless-enabled vehicle component of the motor vehicle, wherein the first network data packet is either an uplink packet or a downlink packet, and the first link port is either an uplink port or a downlink port;
determine an observation period as a function of a transmission time at which the first network data packet was transmitted;
monitor a second link port, opposite the first link port, of the wireless-enabled vehicle component to determine whether or not a second network data packet, opposite the first network data packet, is not received within the observation period thereby indicating detection of a cellular link failure; and
in response to the detection of the cellular link failure, conduct a supplemental assessment of the second link port and/or a corrective action predetermined to re-establish a data link for the second link port.

15. The motor vehicle of claim 14, wherein determining the observation period includes defining a front-end time interval preceding the transmission time of the first network data packet and a back-end time interval following the transmission time.

16. The motor vehicle of claim 14, wherein the electronic vehicle controller is further programmed to:
increment an error detection counter responsive to determining the second network data packet is not received at the second link port within the observation period; and
determine if the error detection counter exceeds a detected error threshold,
wherein the detection of the cellular link failure includes the error detection counter exceeding the detected error threshold.

17. The motor vehicle of claim 16, wherein the electronic vehicle controller is further programmed to monitor the cellular communications device of the wireless-enabled vehicle component for transmission of another network data packet responsive to the error detection counter not exceeding the detected error threshold.

18. The motor vehicle of claim 14, wherein the electronic vehicle controller is further programmed to receive a link trigger causing the wireless-enabled vehicle component to connect with a cellular network, wherein detecting the first network data packet is responsive to receiving the link trigger.

19. The motor vehicle of claim 14, wherein the corrective action includes:
deactivating and subsequently reactivating a cellular data link associated with an access point name (APN) of the wireless-enabled vehicle component; and/or
performing a cellular network detach followed by a cellular network registration with a cellular network serving the wireless-enabled vehicle component.

20. The motor vehicle of claim 14, wherein the supplemental assessment includes evaluating a signal strength and/or a signal quality of the second link port.

* * * * *